May 26, 1931. W. G. HUMPHREYS ET AL 1,807,314

CABLE CONNECTER

Filed July 15, 1929

Inventors
W. G. Humphreys
By O. R. Humphreys
Arthur H. Sturges, Attorney

Patented May 26, 1931

1,807,314

UNITED STATES PATENT OFFICE

WALTER G. HUMPHREYS AND OMAR R. HUMPHREYS, OF OMAHA, NEBRASKA

CABLE CONNECTER

Original application filed September 5, 1928, Serial No. 304,128. Divided and this application filed July 15, 1929. Serial No. 378,293.

The present invention relates to improvements in cable connecters and is a division of our prior application entitled "Drag-line excavating bucket," Serial No. 304,128, filed September 5, 1928.

An object of the invention is to provide an improved cable connecter in which the cable will be securely fixed to the connecter and will not be likely to become accidentally detached therefrom.

Another object of the invention resides in providing an improved cable connecter in which the cable may be looped upon itself whereby drafts upon the cable will result in binding it more tightly to the connecter.

A further object of the invention is to provide an improved cable connecter of a simple form and economical construction in which strength and rigidity are incorporated, and in which the cable may be quickly and with great facility attached to the device.

A still further object of the invention is to provide an improved cable connecter in which the tying of the cable is dispensed with.

A still further object of the invention is to provide an improved cable connecter which is particularly useful in connection with a drag line bucket cable whereby the cable may be wrapped upon itself to secure it tightly in the device.

With the foregoing and other objects in view, the invention will be more fully described hereinafter and will be more particularly pointed out in the claims appended hereto.

In the drawings, wherein like symbols refer to like or corresponding parts throughout the several views, Figure 1 is a side elevation of an improved cable connecter constructed in accordance with the present invention.

Figure 1:
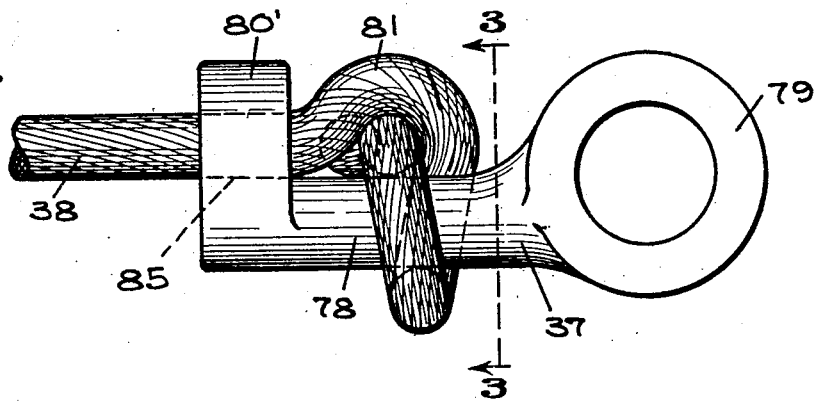

Referring more particularly to the drawings 37 designates the body portion of the cable connecter. The shank portion is represented at 78. This shank portion is provided with an eye 79 at one end which is the eye which receives the pivot pin 80 shown and described in connection with Figure 1 of the parent application aforesaid. The connection of the device is to the clip referred to as 36 in the parent application.

At the other end of the shank 78 is an upstanding eye 80' having its axis disposed at substantially right angles to the eye 79 and this eye 80' extends above the shank 78 to admit of receiving the cable 38. After passing through the eye, the cable is wound one or more times about the shank 78, and the terminal end of the cable is inserted beneath the longitudinal portion 81 thereof, and such terminal end of the cable is provided with a binding or enlargement 82. When a pull is exerted upon the cable 38, the looped-up portion 81 will tend to bind down upon the inserted end portion and thus the cable will be constrained to more tightly grip the shank 78. The aperture 85 through the eye portion 80' is in alinement with and to one side of the round shank 78. It will be understood that this eye is particularly useful in connection with a stiff wire cable 38 and that by reason of the hole 85 being in alinement with the round shank 78, the cable may be inserted through it in a manner whereby the cable may be wrapped upon itself as shown.

Figure 2:
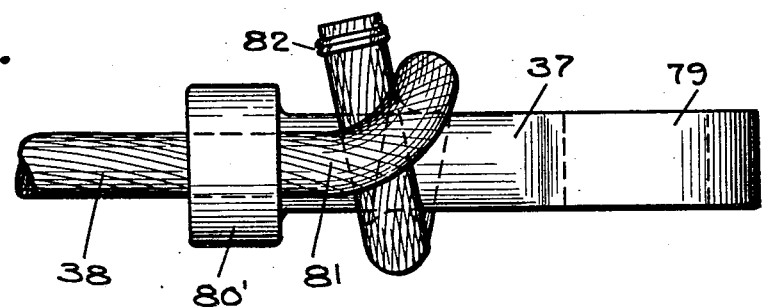
Figure 2 is a top plan view of the same.
Figure 3:
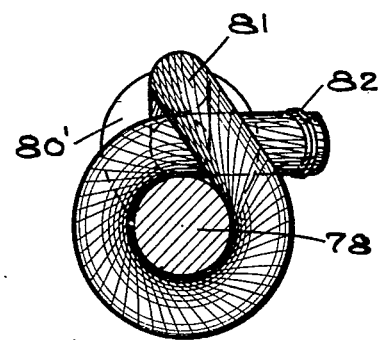
Figure 3 is a cross section taken along the line 3—3 in Figure 1.

The shank 78 is shown to be round in the cross sectional view Figure 3 whereby to facilitate the rotary movement given the cable end in order to bring it to the knotted condition shown in Figures 1 and 2. The axis of the eye 85 is parallel with the axis of the round shank 78, but these axes are offset and do not coincide. The external surface of the round shank 78 will induce a slipping of the cable therealong by reason of the smooth character of the shank. The bight 81 will be formed by reason of the sliding of this cable toward the eye 85 and by reason of the cable being forced upwardly from the eye by the terminal end 82 engaging therebeneath. This bight will serve effectually to prevent the cable from being accidentally loosened and permitted to slip through the eye 85.

We do not wish to be restricted to the size, form and proportions of the various parts, and obviously changes could be made in the construction herein described without departing from the spirit of the invention, it being only necessary that such changes fall within the scope of the following claims:

We claim:

1. In a cable connecter, the combination of a shank member provided with a cable receiving opening, the side walls of said opening being in substantial alinement with and to one side of said shank, a cable wrapped about the shank and extending through said opening, said cable being looped under itself in a manner whereby stresses applied to said cable or said connecter are adapted to cause a binding engagement between said shank and said cable.

2. In combination with a stiff cable, of an improved cable connecter comprising a shank having means to attach the same to a support, and an eye having its axis disposed parallel to and beside the axis of the shank, said eye adapted to receive the cable, and the cable adapted to be looped about the shank and having a terminal end inserted beneath the cable near the point where such cable passes through the eye.

3. An improved cable connecter comprising a relatively narrow elongated shank having a smooth exterior with eyes at both ends thereof, the axes of said eyes being disposed at substantially right angles to one another, and the axis of one of the eyes being disposed above and substantially parallel with the axis of said shank.

4. An improved cable connecter comprising a shank having means at one end thereof to attach the same to a support, and having a guide member at its opposite end and offset from said shank, said guide member having a cable receiving eye therein parallel to the longitudinal axis of the shank, and having its inner wall in alignment with said shank.

In testimony whereof, we affix our signatures.

WALTER G. HUMPHREYS.
OMAR R. HUMPHREYS.